United States Patent
Engstrom (10) Patent No.: US 7,350,925 B2
(45) Date of Patent: Apr. 1, 2008

(54) TOTAL INTERNAL REFLECTION FRESNEL LENS AND OPTICAL SYSTEM USING THE SAME

(75) Inventor: Frederic R. Engstrom, Hillsboro, OR (US)

(73) Assignee: 3M Innovative Properties Company, St. Paul, MN (US)

(*) Notice: Subject to any disclaimer, the term of this patent is extended or adjusted under 35 U.S.C. 154(b) by 249 days.

(21) Appl. No.: 10/935,638

(22) Filed: Sep. 7, 2004

(65) Prior Publication Data

US 2006/0050241 A1    Mar. 9, 2006

(51) Int. Cl.
*G03B 21/28* (2006.01)
*G03B 21/20* (2006.01)
*G03B 21/60* (2006.01)

(52) U.S. Cl. .................... 353/38; 353/78; 353/99; 353/102; 359/457; 359/459; 359/460

(58) Field of Classification Search ............ 353/46, 353/47, 50, 74, 77–79, 98, 99, 38, 102; 359/443, 359/454–457, 459, 460
See application file for complete search history.

(56) References Cited

U.S. PATENT DOCUMENTS

| 719,066 | A | 1/1903 | Wadsworth |
|---|---|---|---|
| 3,447,860 | A | 6/1969 | Lucas |
| 4,482,206 | A | 11/1984 | VanBreemen |
| 4,674,836 | A | 6/1987 | Yata et al. |
| 4,708,435 | A | 11/1987 | Yata et al. |
| 4,729,631 | A | 3/1988 | Takahashi et al. |
| 5,029,060 | A | 7/1991 | Aho |
| 5,150,966 | A | 9/1992 | Nelson |
| 5,710,671 | A | 1/1998 | Bichlmaier |

(Continued)

FOREIGN PATENT DOCUMENTS

JP    2002196413    7/2002

(Continued)

OTHER PUBLICATIONS

The Fresnel Lens—"The Shining Eye of the Lighthouse" (http://www.lanternroom.com/misc/freslens.htm),1997-2000.

(Continued)

*Primary Examiner*—Rochelle Blackman
(74) *Attorney, Agent, or Firm*—Robert S. Moshrefzadeh (57) ABSTRACT

Described is an optical lens having a light-receiving surface facing a light source and a first structured surface opposite a first portion of the light-receiving surface. The first structured surface includes a plurality of first reflecting surfaces and first refractive surfaces. Each of the first refractive surfaces receives light from a corresponding first reflective surface for refractive transmission therethrough. The optical system may further include a second structured surface opposite a second portion of the light-receiving surface. The second structured surface includes a plurality of second refractive surfaces. Each of the second refractive surfaces receives light directly from the light-receiving surface. Where the first and second structured surfaces are included, the first and second portions of the light-receiving surface can be positioned so that light projected from the light source at an angle above a threshold angle falls on the first portion and light at an angle below the threshold angle falls on the second portion.

34 Claims, 6 Drawing Sheets

U.S. PATENT DOCUMENTS

| | | |
|---|---|---|
| 6,520,643 B1 | 2/2003 | Holman et al. |
| 6,631,994 B2 | 10/2003 | Suzuki |
| 2002/0089743 A1 | 7/2002 | Ogawa |
| 2003/0058532 A1 | 3/2003 | Suzuki |
| 2003/0072077 A1 | 4/2003 | Peterson |
| 2004/0032570 A1 | 2/2004 | Peterson |
| 2005/0046939 A1* | 3/2005 | Yoshikawa et al. ......... 359/457 |

FOREIGN PATENT DOCUMENTS

| | | |
|---|---|---|
| JP | 2003005275 | 1/2003 |
| JP | 2004070188 | 3/2004 |
| JP | 2004077535 | 3/2004 |
| JP | 2004093918 | 3/2004 |
| WO | WO 2002/29451 A1 | 4/2002 |

OTHER PUBLICATIONS

"Fresnel Lenses in Rear Projection Displays." Arthur Davis et al in the SID 2001 International Symposium Digest, vol. 32.

"Use of Fresnel Lenses in Optical Systems: Some Advantages and Limitations." John Egger in SPIE vol. 133 Optical Systems Engineering, 1979.

"Refractive-reflective Optical System for Realizing an Ultra-Thin Rear Projector." Shikama, Suzuki et al, Journal of the SID, 11/4, 2003.

"DNP Customizes Screens for Ultra-Short-Throw Projectors" MicroDisplay Report, Jul. 2004.

* cited by examiner

TOTAL INTERNAL REFLECTION FRESNEL LENS AND OPTICAL SYSTEM USING THE SAME

FIELD OF INVENTION

The invention relates generally to a projection display system and in particular, an optical lens for a projection display system.

BACKGROUND INFORMATION

Several technologies exist for display systems including cathode ray tubes ("CRT"), projection displays, and plasma displays. For large displays (e.g., a screen diagonal greater than 1 m (40 inch)), CRT usually is not practical. Plasma and projection displays are often favored for larger display systems because they may be produced with lighter weights and thinner depths than conventional CRT displays.

Rear projection systems (e.g., a rear projection television) generally include a projection lens system to project light (e.g., images) on a projection screen. The depth of a rear projection system is limited in part by the angle from which the projection lens is capable of displaying images (i.e., the projection lens angle). Several solutions have been employed to increase the projection lens angle, including the use of a Fresnel lens adjacent to the projection screen. However, as the projection angle is increased, rear projection systems tend to experience low transmission and significant color dispersion.

SUMMARY

The present disclosure is directed to an optical lens having a light-receiving surface that can be disposed facing a light source to receive light therefrom and a first structured surface opposite a first portion of the light-receiving surface. The first structured surface includes a plurality of first reflecting surfaces projecting at a plurality of first angles relative to the light-receiving surface and a plurality of first refractive surfaces projecting at a plurality of second angles relative to the light-receiving surface. Each of the first refractive surfaces receives light from a corresponding one of the first reflective surfaces for transmission therethrough.

In some exemplary embodiments of the present disclosure, the optical lens may further include a second structured surface opposite a second portion of the light-receiving surface. The second structured surface includes a plurality of second refractive surfaces projecting at a plurality of third angles relative to the light-receiving surface. Each of the second refractive surfaces may receive light from the light-receiving surface for transmission therethrough.

In the exemplary embodiments that include the first and second structured surfaces, the first and second portions of the light-receiving surface may be positioned so that light from a light source incident on the light-receiving surface at an angle above a threshold angle falls on the first portion and light incident on the light-receiving surface at an angle below the threshold angle falls on the second portion.

BRIEF DESCRIPTION OF DRAWINGS

So that those having ordinary skill in the art to which the subject invention pertains will more readily understand how to make and use the subject invention, exemplary embodiments thereof will be described in detail below with reference to the drawings, wherein.

DETAILED DESCRIPTION

The present disclosure is directed to an optical lens and to an optical system including the optical lens. In particular, the present disclosure is directed to an optical lens including a total internal reflection ("TIR") Fresnel optical lens. The disclosed invention may be useful, for example, in projection systems and ultra-thin projection systems. The disclosed invention may improve light transmission, minimize dispersion, and reduce ghost light beams in projection systems.

Figure 1A:
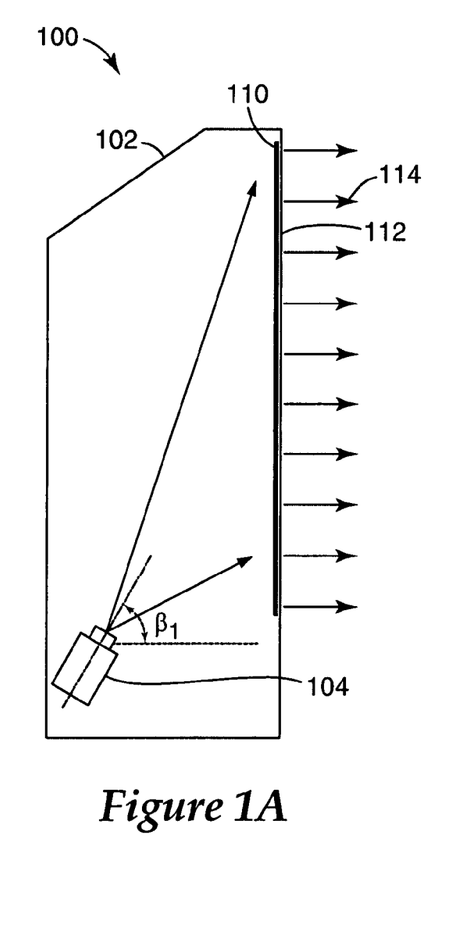
FIG. 1A shows a cross-sectional view of an exemplary projection system according to the present disclosure.
Figure 1B:
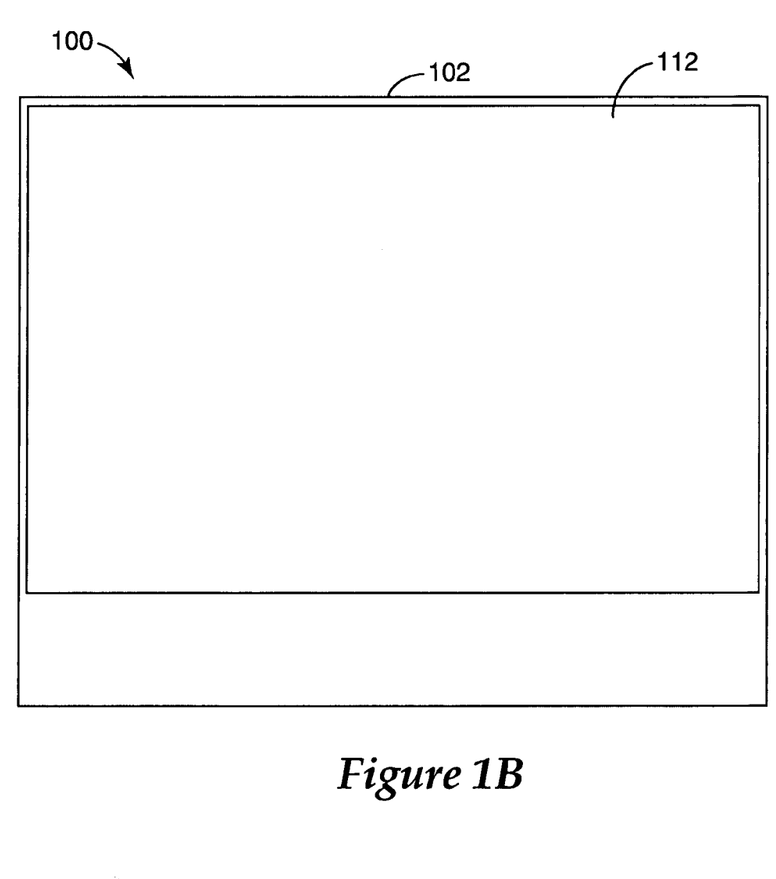
FIG. 1B shows a front perspective view of the exemplary projection system shown in FIG. 1A.

FIGS. 1A and 1B show an exemplary embodiment of a projection system 100 according to the present disclosure. The projection system 100 may be, for example, a rear projection television. The projection system 100 includes an enclosure 102. The enclosure 102 may be of any material, shape, or size known to those skilled in the art. The projection system 100 may include a light source and a projection lens, collectively designated as 104. The projection lens 104 may be mounted within the enclosure 102 at a projection lens angle $\beta_1$ (beta one). The projection lens angle $\beta_1$ may be, for example, an angle greater than forty-two (42) degrees.

An optical lens 110 may be included in the enclosure 102. In the exemplary embodiment shown in FIGS. 1A and 1B, the optical lens 110 is positioned substantially parallel to a projection screen 112 and preferably adjacent to the projection screen 112. The optical lens 110 may receive light (e.g., images) from the projection lens 104, and transmit at least a substantial portion of the light through the projection screen 112 in a general direction 114. The general direction 114 may be, for example, towards a viewer (not shown) of the projection system 100. Further exemplary embodiments of the optical lens 110 are described below.

Figure 2A:
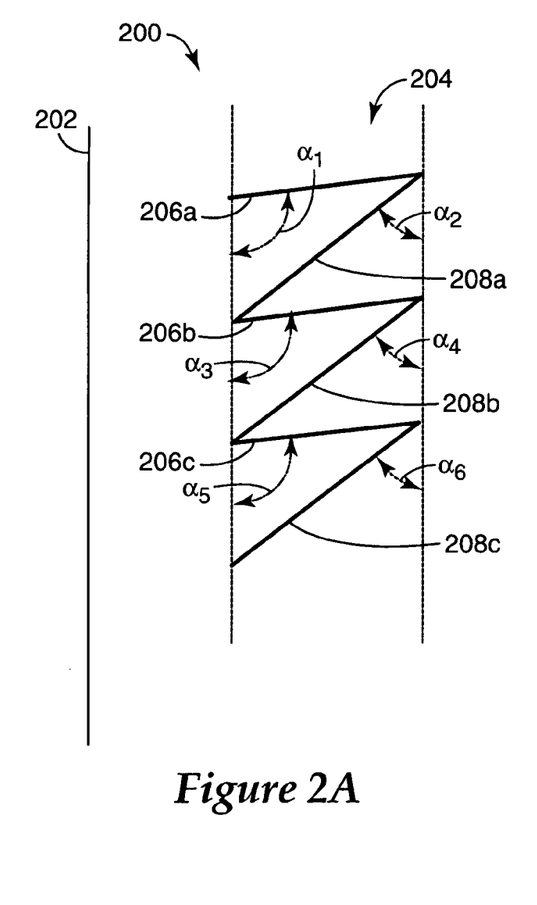
FIG. 2A shows a partial schematic cross-sectional view of an exemplary embodiment of an optical lens according to the present disclosure.
Figure 2B:
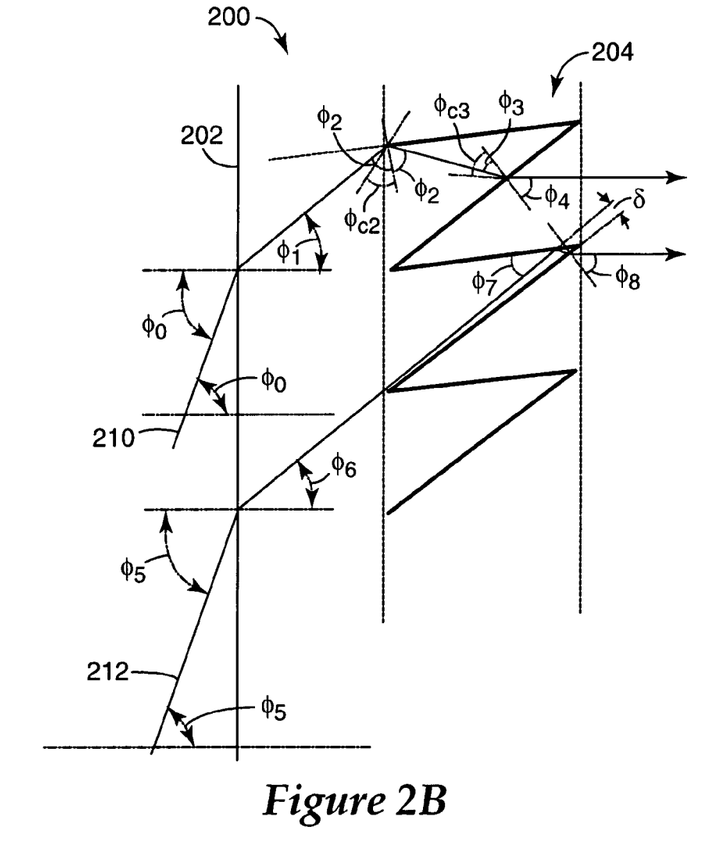
FIG. 2B shows another partial schematic cross-sectional view of the exemplary embodiment of an optical lens shown in FIG. 2A.

FIGS. 2A and 2B show a partial schematic cross-sectional view of an exemplary embodiment of an optical lens 200 according to the present disclosure. The body of the optical lens 200 may be made of any known material with an appropriate refractive index (e.g., 1.49), such as an acrylic. The optical lens 200 may include an input surface 202 which may be, for example, a substantially planar and refractive surface. A portion of light transmitted from the light source and projection lens 104 may be refracted at the input surface 202 depending on the angle at which the light meets the input surface 202 (e.g., incident angle), the polarization of the light, the wavelength of the light, and the refractive index of the material of the body of the optical lens 200.

The optical lens 200 may include a first structured surface 204. The first structured surface 204 may be rigid or flexible and may be manufactured using a hard or flexible mold. The first structured surface 204 may be, for example, a TIR Fresnel lens. The first structured surface 204 may be disposed opposite to the input surface 202 on the viewing side of a rear projection system (e.g., projection system 100). Preferably, a substantial portion of light transmitted from a projection lens (e.g., the projection lens 104) is refracted through the input surface 202 in a general direction towards the first structured surface 204.

The first structured surface 204 may include a plurality of first reflective surfaces 206a, 206b, 206c (hereinafter collectively called "206"). The first reflective surfaces 206 may be, for example, TIR surfaces. For example, the first reflective surface 206a may be situated at a surface angle $\alpha_1$ (i.e., alpha one) with respect to a plane generally parallel to the optical lens 200 (e.g., a vertical plane). The first reflective surfaces 206b and 206c may likewise be situated at surface angles $\alpha_3$ and $\alpha_5$, respectively. The surface angles of the first reflective surfaces 206 may also be unequal (e.g., $\alpha_1$ not equal to $\alpha_3$ not equal to $\alpha_5$). At least some of the first reflective surfaces 206 in the exemplary embodiment may be undercut, i.e., having surface angles $\alpha$ greater than ninety (90) degrees (e.g., one hundred (100) degrees). However, in some exemplary embodiments, at least some of the first reflective surfaces 206 may be situated at surface angles $\alpha$ less than ninety (90) degrees.

The first structured surface 204 may also include a plurality of first refractive surfaces 208a, 208b, 208c (hereinafter collectively called "208"). For example, the first refractive surface 208a may be situated at a surface angle $\alpha_2$ (i.e., alpha two) with respect to a plane generally parallel to the optical lens 200 (e.g., a vertical plane), and the first refractive surfaces 208b and 208c may be situated at surface angles $\alpha_4$ and $\alpha_6$ respectively. In the exemplary embodiment, the surface angles of the first refractive surfaces 208 (e.g., $\alpha_2$ and $\alpha_4$) are preferably similar or equal to the complementary (90 degrees–alpha) angles to the expected exit angles (e.g., exit angle $\Phi_4$ and $\Phi_8$) of light beams passing through the optical lens 200. As one of ordinary skill in the art will understand, this may result in a substantial portion of light being directed in the direction 114 (shown in FIG. 1), e.g., a substantially horizontal direction.

As one of ordinary skill in the art will know, the amount of refraction a light beam experiences while passing from one medium into another medium (e.g., into one of different density) is determined by the relative refractive indexes and Snell's Law. Based on the principles of Snell's Law, when light encounters, or is incident upon, a medium having a lesser refractive index, the light beam is bent away from the normal at an exit angle greater than the incident angle. Snell's Law can be expressed by the formula:

$$n_i * \sin \Phi_i = n_t * \sin \Phi_t,$$

where,
$n_i$=the refractive index of the material on the side of incident light,
$\Phi_i$=the incident angle,
$n_t$=the refractive index of the material on the side of transmitted light, and
$\Phi_t$=the exit angle.

As shown in FIG. 2B, a light beam 210 transmitted from the projection lens (e.g., the projection lens 104) at a projection angle $\Phi_0$ (i.e., phi zero) may encounter the input surface 202 at the angle $\Phi_0$ relative to a normal to the input surface 202. As one of ordinary skill in the art will understand, the incident angle $\Phi_0$ at the input surface 202 and the projection angle $\Phi_0$ of the light beam may be the same. In the present example, the light beam 210 will refract and pass through the input surface 202. The light beam 210 may exit the input surface 202 at a first exit angle $\Phi_1$ determined from the Snell's Law equation.

Shown in FIG. 2B, the light beam 210 may encounter the first reflective surface 206a at an incident angle $\Phi_2$. In the exemplary embodiment, the first reflective surface 206a is situated at the surface angle $\alpha 1$ such that a substantial portion of light beams that encounter the first reflective surface 206a will have an incident angle (e.g., $\Phi_2$) to the first reflective surface 206a greater than a predetermined critical angle $\Phi_{c2}$. As one of ordinary skill in the art would understand, a light beam traveling from a higher refractive index material to one of lower refractive index will generally refract when its incident angle to a surface is less than a predetermined critical angle $\Phi_c$ (e.g., $\Phi_{c2}$) and reflect when equal to or greater than the critical angle $\Phi_c$ (e.g., $\Phi_{c2}$).

One of ordinary skill will further understand that the critical angle $\Phi_c$ at a surface (e.g., the first reflective input surface 206a) may be determined according to the Snell's Law (described above) by setting the exit angle $\Phi_t$ to ninety (90) degrees and solving for the incident angle $\Phi_i$. It may be noted that incident angles and critical angles are often represented with respect to a normal to the surface (e.g., surface 206a), however, in the present disclosure some angles may likewise be discussed with respect to the surface, i.e., their complement angle.

As discussed above, the incident angle $\Phi_2$ in the present example is greater than the critical incident angle $\Phi_{c2}$. Therefore, there may be total internal reflection of the light beam 210 at the first reflective surface 206a (i.e., the light beam will be reflected rather than being refracted and transmitted through the surface). The light beam 210 reflected from the first reflective surface 206a may then encounter the first refractive surface 208a at an incident angle $\Phi_3$. The incident angle $\Phi_3$ may be less than a critical angle $\Phi_{c3}$ at the first refractive surface 208a. Therefore, the light beam 210 may pass through the first refractive surface 208a at a second exit angle $\Phi_4$ (e.g., in a general direction 114 or similar direction).

Shown in FIG. 2B, a light beam 212 with a projection angle $\Phi_5$ may encounter the input surface 202. The light beam 212 may be refracted and pass through the input surface 202 with a first exit angle $\Phi_6$. The refracted light beam 212 may encounter the first reflective surface 206b at an angle $\Phi_7$ with respect to the first reflective surface 206b and reflect at substantially the same angle $\Phi_7$ (i.e., total internal reflection occurs). The reflected light beam 212 may next encounter the first refractive surface 208b and pass through the first refractive surface 208b at a second exit angle $\Phi_8$ (e.g., in the general direction 114).

As discussed above, light transmitted from a projection lens (e.g., the projection lens 104) may encounter the optical lens 200, reflect off one of the first reflective surfaces 206, and pass through one of the first refractive surfaces 208. To direct multiple light beams originating from the same projection lens in substantially the same general directions (e.g., the direction 114), the surface angles α may be varied (e.g., $\alpha_1$ not equal to $\alpha_3$, $\alpha_4$ not equal to $\alpha_6$) at different locations along the first structured surface 204. For example, the optical lens 200 may be employed in the projection system 100 (shown in FIG. 1). Given a fixed projection lens 104 location (e.g., fixed angle $\beta_1$), incident angles of light received in the vicinity of the first reflective surface 206b and the first refractive surface 208b may be estimated. The surface angles $\alpha_3$ and $\alpha_4$ of the first reflective surface 206b and the first refractive surface 208b, respectively, may then be chosen such that a substantial portion of the received light is refracted in the general direction 114. For example, the angle $\alpha_4$ may be chosen so as to situate the first refractive surface 208b slightly more horizontal than the expected direction of a light beam (e.g., the light beam 212).

In the exemplary embodiment, the refractive surface 208b may be situated such that the expected angle of light beams (e.g., angle $\Phi_6$ of the light beam 212) is greater than the surface angle of the first refractive surface 208b (i.e., 90 minus $\alpha_4$) by an angle δ (delta). Angle δ may be approximately equal to two (2) degrees. Therefore, light beams received in the vicinity of the first reflective surface 206b and the first refractive surface 208b may generally encounter the first reflective surface 206b before the first refractive surface 208b. As one of ordinary skill in the art will understand, preferred surface angles α may be similarly chosen for each of the first reflective surfaces 206 and/or for each of the first refractive surfaces 208 in the first structured surface 204 according to the present disclosure.

Figure 3A:
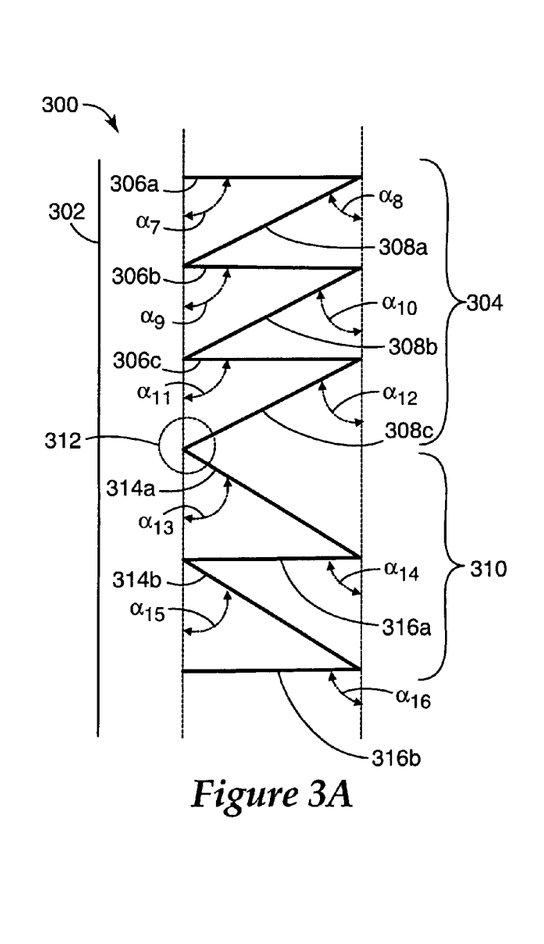
FIG. 3A shows a partial schematic cross-sectional view of another exemplary embodiment of an optical lens according to the present disclosure.
Figure 3B:
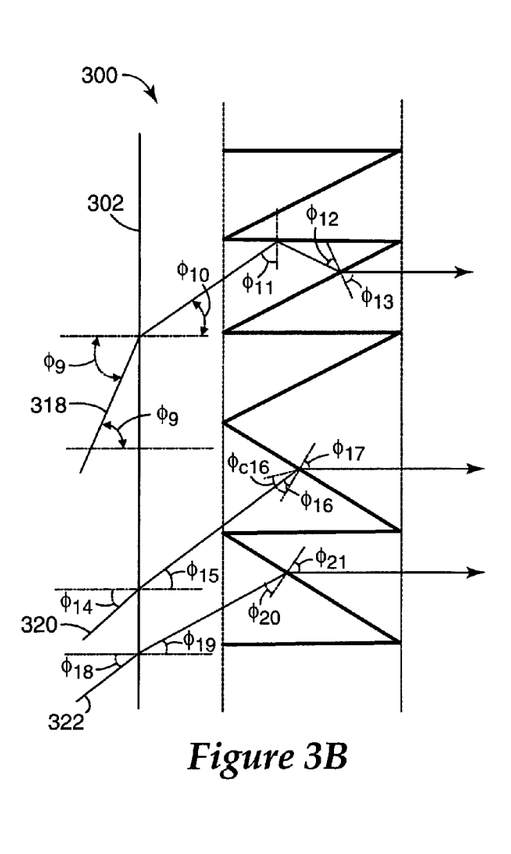
FIG. 3B shows another partial schematic cross-sectional view of the exemplary embodiment of an optical lens shown in FIG. 3A.

FIGS. 3A and 3B show a cross-sectional view of another exemplary embodiment of the optical lens 110 according to the present disclosure (e.g., an optical lens 300). The body of the optical lens 300 may be made of any known material with an appropriate refractive index, such as an acrylic. The optical lens 300 may include an input surface 302 which may be, for example, a substantially planar and refractive surface. The optical lens 300 may include a first structured surface 304. The first structured surface 304 may be, for example, a TIR Fresnel lens. The first structured surface 304 may include a plurality of first reflective surfaces 306a, 306b, 306c (hereinafter collectively called "306"). For example, the first reflective surface 306a may be situated at a surface angle $\alpha_7$ with respect to a plane generally parallel to the optical lens (e.g., a vertical plane). The first reflective surfaces 306b and 306c may likewise be situated at surface angles $\alpha_9$ and $\alpha_{11}$ respectively. The first reflective surfaces 306 may be, for example, TIR surfaces.

The first structured surface 304 may also include a plurality of first refractive surfaces 308a, 308b, 308c (hereinafter collectively called "308"). For example, the first refractive surface 308a may be situated at a surface angle $\alpha_8$ with respect to the vertical, and the first refractive surfaces 308b and 308c may be situated at surface angles $\alpha_{10}$ and $\alpha_{12}$, respectively.

The optical lens 300 may include a second structured surface 310 separated from the first structured surface 304 by a transition region 312. The second structured surface 310 may be, for example, a Fresnel lens (e.g., conventional refractive Fresnel lens). The second structured surface 310 may include a plurality of second refractive surfaces 314a, 314b (hereinafter collectively called "314") and riser surfaces 316a, 316b (hereinafter collectively called "316"). The second refractive surfaces 314 may be situated at surface angles $\alpha_{13}$ and $\alpha_{15}$ with respect to a plane parallel to the optical lens (e.g., a vertical plane). The riser surfaces 316 may likewise be situated at surface angles $\alpha_{14}$ and $\alpha_{16}$ respectively.

In the exemplary embodiment, the surface angles $\alpha_{14}$ and $\alpha_{16}$ of the riser surfaces 316 may be greater than expected first exit angles from the input surface 302 (e.g., first exit angles $\Phi_{15}$ and $\Phi_{19}$, respectively) and less than or about equal to ninety (90) degrees. As one of ordinary skill in the art will understand, surface angles $\alpha_{14}$ and $\alpha_{16}$ chosen within such limits will result in light beams (e.g., 320, 322) from the input surface 302 generally encountering the second refractive surfaces 314 rather than the riser surfaces 316. Further, light beams (e.g., 322) exiting the second refractive surface 314 will generally not impinge on the riser surfaces 316.

The second structured surface 310 may be disposed next to the first structured surface 304 and positioned to receive light from the projection lens 104 at lower projection angles than light received by the first structured surface 304. The projection angle (e.g., $\Phi_9$, $\Phi_{14}$, $\Phi_{18}$) below which a light beam may encounter the second structured surface 310 rather than the first structured surface 304 will be referred to as a threshold angle. Those of ordinary skill in the art will understand that where the transition region 312 has an appreciable extent, the threshold angle will become a threshold angle range. The threshold angle may be any angle chosen to suit the specific application of the optical lens 300.

To avoid visible light transmission discontinuities at the transition region 312, the threshold angle may be the angle at which the percent transmission through the first structured surface 304 is essentially the same as the percent transmission through the second structured surface 310. However, other appropriate criteria for selecting the threshold angle or the threshold angle range may be used depending on a particular application. This may occur, for example, when $\alpha_{11}$ is equal to ninety (90) degrees and $\alpha_{12}$ is essentially equal to $\alpha_{13}$. For example, the optical lens 300 may have a threshold angle approximately equal to forty-three (43) degrees and an angle δ (shown in FIG. 2B) approximately equal to two (2) degrees. Thus, in such exemplary embodiments, a light beam transmitted from the projection lens 104 with a projection angle of at least about forty-three (43) degrees (i.e., the threshold angle) may encounter the first structured surface 304, and light with a projection angle less than about forty-three (43) degrees may encounter the second structured surface 310.

In exemplary embodiments of the present disclosure, the threshold angle or the threshold angle range may be selected based on the transmission of S- and P-polarized light through a conventional Fresnel lens as compared to a TIR Fresnel lens and the dispersion caused by these respective structures. For example, it may be determined by mathematical modeling of performance of an acrylic optical lens 300 that at angles greater than about 43 degrees, the transmission of both polarizations through the TIR Fresnel is higher than transmission through a conventional Fresnel lens. In addition, it may be determined by mathematical modeling of performance of an acrylic optical lens 300, that for input angles greater than about 43 degrees, the dispersion caused by TIR Fresnel is less than that of the conventional Fresnel. Thus, the angle of about 43 degrees may be advantageously selected as a threshold angle for such exemplary embodiments. In other exemplary embodiments the optical lens 300 may have a threshold angle range of about 42 degrees to about 43 degrees. However, other threshold angles may be suitable for optical lenses made of other materials or constructed to achieve different optical performance.

As shown in FIG. 3B, a light beam 318 with a projection angle $\Phi_9$ greater than the predetermined threshold angle may encounter the input surface 302. The light beam 318 may be refracted at a first exit angle $\Phi_{10}$. The light beam 318 may next encounter the first structured surface 304 at the first reflective surface 306b. The light beam 318 may approach at an incident angle $\Phi_{11}$ (e.g., greater than a critical angle $\Phi_c$) and reflect at substantially the same angle $\Phi_{11}$ (e.g., total internal reflection occurs). The light beam 318 may then encounter the first refractive surface 308b at an incident angle $\Phi_{12}$ and pass through the refractive surface 308b at a second exit angle $\Phi_{13}$.

A light beam 320 may encounter the input surface 302 with a projection angle $\Phi_{14}$ being less than the threshold angle. Therefore, the light beam 320 may be refracted at a first exit angle $\Phi_{15}$ and encounter the second refractive surface 314a in the second structured surface 310 at an incident angle $\Phi_{16}$. The incident angle $\Phi_{16}$ may be less than a critical angle $\Phi_{c16}$ at the second refractive surface 314a, and therefore the light beam 320 may refract at a second exit angle $\Phi_{17}$. Similarly, a light beam 322 may encounter the input surface 302 with a projection angle $\Phi_{18}$. The projection angle $\Phi_{18}$ may be less than the threshold angle and less than the projection angle $\Phi_{14}$ of light beam 320. The light beam may be refracted (e.g., at a first exit angle $\Phi_{19}$) in a general direction towards the second structured surface 310. The light beam 322 may encounter the second refractive surface 314b of the second structured surface 310 at an incident angle $\Phi_{20}$ and refract at a second exit angle $\Phi_{21}$.

Figure 4A:
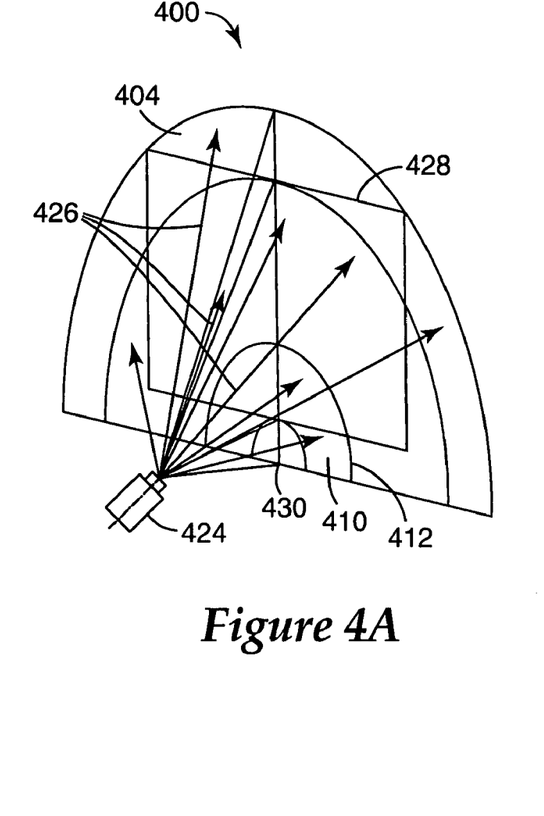
FIG. 4A shows a perspective view of another exemplary embodiment of an optical lens according to the present disclosure.
Figure 4B:
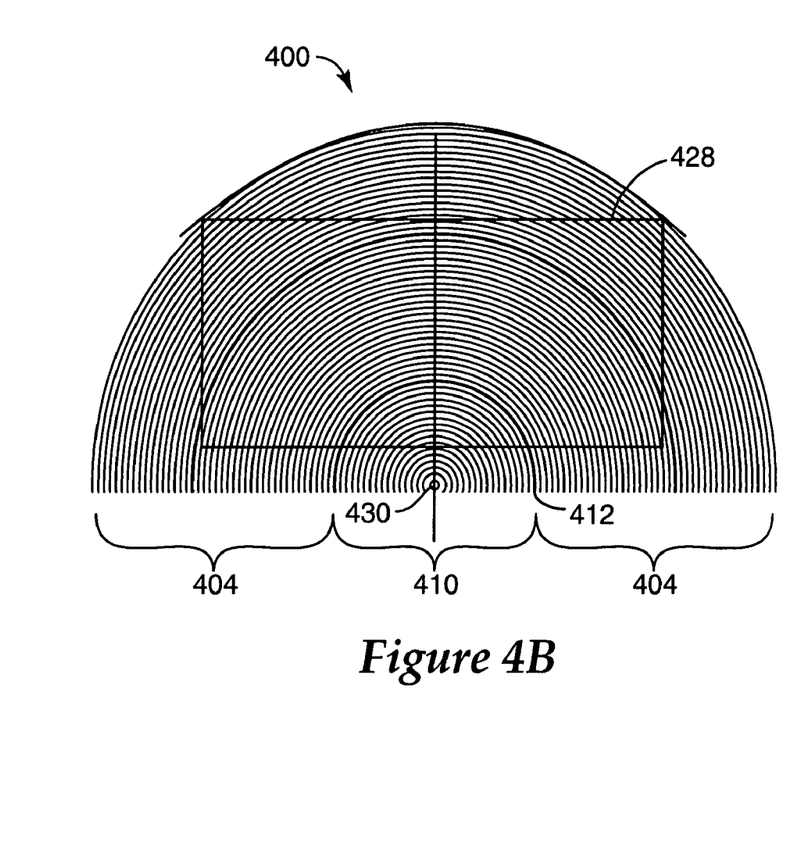
FIG. 4B shows a perspective view of another exemplary embodiment of an optical lens according to the present disclosure.
Figure 4C:
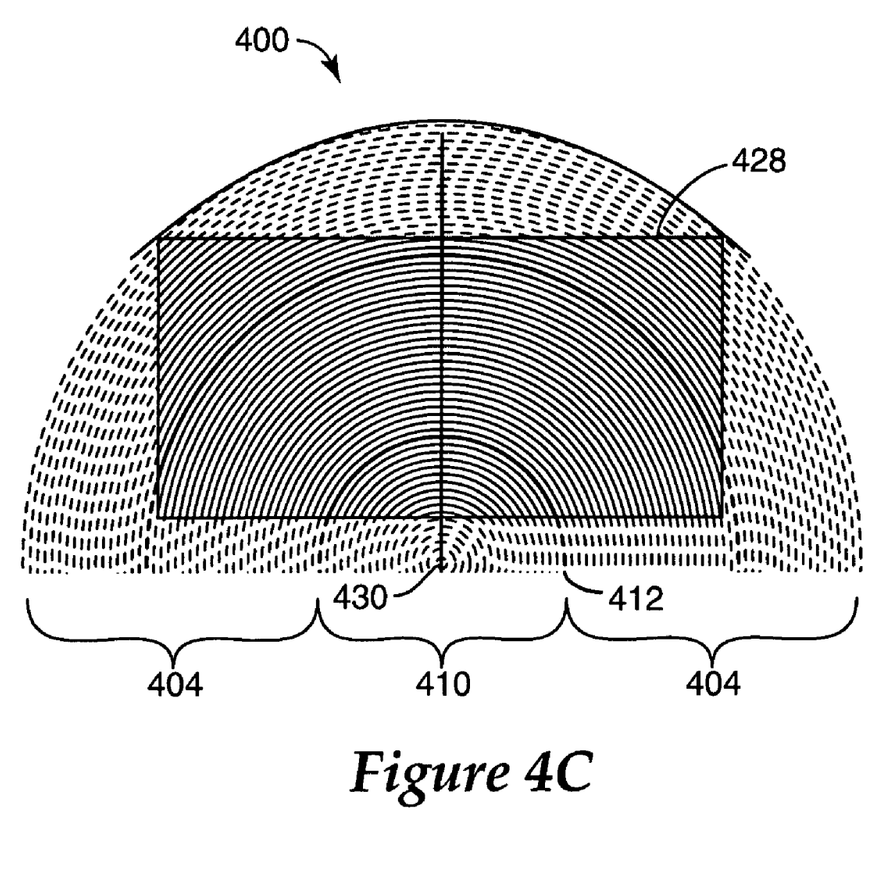
FIG. 4C shows a perspective view of another exemplary embodiment of an optical lens according to the present disclosure.

FIGS. 4A-4C show an optical lens 400 according the present disclosure. As one of ordinary skill in the art will understand, the optical lens 400 may be a semicircular shape. Although the entire semicircular shape is shown in FIGS. 4A and 4B for the purposes of the present disclosure, the optical lens 400 may generally be limited (e.g., trimmed) to the rectangular size of a projection screen 428 as shown in FIG. 4C. The optical lens 400 may include a first structured surface 404 and a second structured surface 410 meeting at a transition region 412. The first structured surface 404 and the second structured surface 410 may include a plurality of reflective and refractive surfaces (e.g., which are substantially similar to the surfaces 306, 308, 314, 316). In the exemplary embodiment, the first structured surface 404 may include a TIR Fresnel lens and the second structured surface 410 may include a conventional refractive Fresnel lens.

As shown in FIG. 4A, a projection lens 424 may transmit a plurality of light beams 426. The light beams 426 may be transmitted at various projection angles in general directions towards the optical lens 400 and the projection screen 428. As one of ordinary skill in the art will understand, the projection angle for each of the light beams 426 may lie in planes different from one another. For example, the projection angle for each of the light beams 426 may be determined in a plane including the light beam and a parent axis point 430 shown in FIGS. 4A-4C. In the exemplary embodiment, the parent axis point 430 is situated outside a rectangular area of the optical lens 400 that corresponds to the projection screen 428. In other embodiments, however, the parent axis point 430 may be situated within the rectangular area (e.g., centered within the projection screen 428).

As shown in FIG. 4A, those light beams 426 transmitted at projection angles greater than or equal to a predetermined threshold angle may encounter the first structured surface 404; and those light beams 426 transmitted at a projection angle less than the predetermined threshold angle may encounter the second structured surface 410. In some exemplary embodiments, the threshold angle may be about forty-three (43) degrees. However, the threshold angle may be any angle chosen to suit the specific application, or it may be a threshold angle range.

Figure 5A:
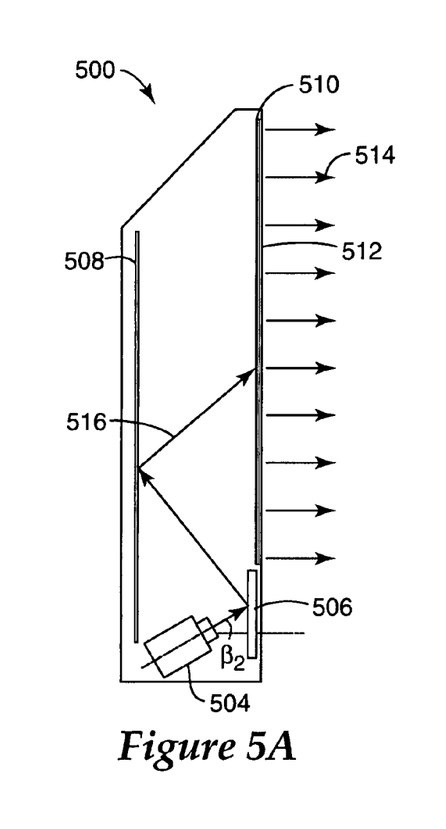
FIG. 5A shows a cross-sectional view of another exemplary projection system according to the present disclosure.
Figure 5B:
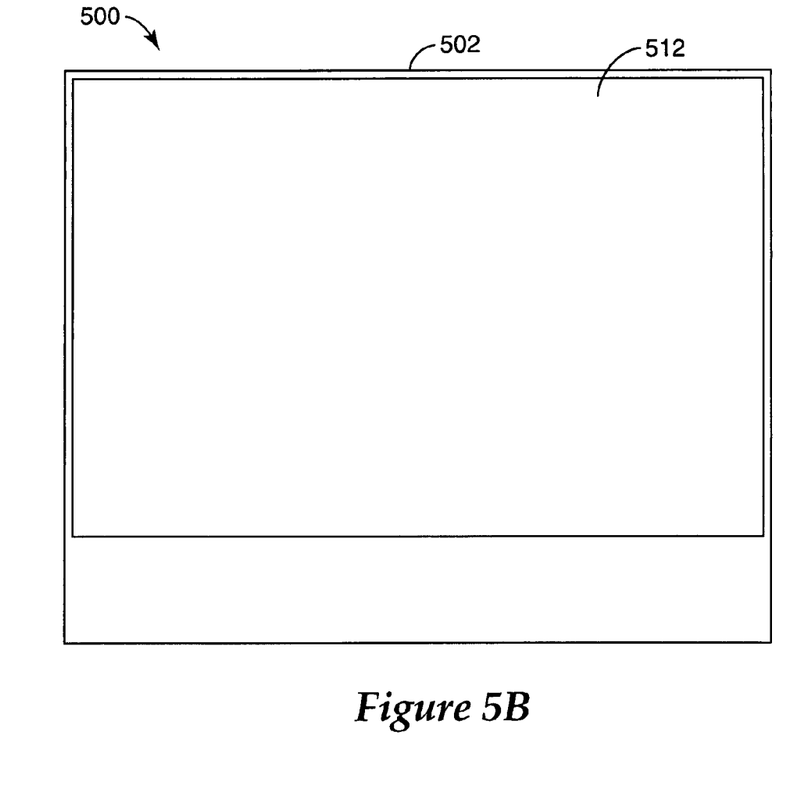
FIG. 5B shows a front perspective view of the exemplary projection system shown in FIG. 5A.

FIGS. 5A and 5B show another exemplary embodiment of projection system 500 according to the present disclosure. The projection system 500 may include an enclosure 502 and a projection lens 504 with a projection lens angle $\beta_2$ (beta two). The projection system 500 may include an optical lens 510 and a projection screen 512 situated within the enclosure 502. The projection system 500 may be, for example, an ultra-thin rear projection system. As one or ordinary skill in the art will understand, an ultra-thin rear projection system (e.g., projection system 500) may have an enclosure depth of less than twenty (20) percent of a diagonal of the projection screen (e.g., 512).

The projection system 500 may further include an aspheric mirror 506. As one of ordinary skill in the art will understand, the aspheric mirror 506 may allow for a thinner enclosure 502 by employing offset optics, thus reducing the horizontal distance from the projection lens to the projection screen 512. The exemplary embodiment may further include a cabinet mirror 508 within the enclosure 502; however, other embodiments may not require the cabinet mirror 508. The cabinet mirror 508 may be useful for reflecting light transmitted from the projection lens 504 and the aspheric mirror 506. For example, a light beam 516 may be transmitted from the projection lens 504 and reflected off the aspheric mirror 506 and the cabinet mirror 508 in a general direction towards the optical lens 510. The light beam 516 may pass through the optical lens 510 in a general direction 514 towards a viewer of the projection system 500.

It will be apparent to those skilled in the art that various modifications and variations can be made in the structure and the methodology of the present disclosure, without departing from the spirit or scope of the invention. Thus, it is intended that the present disclosure cover the modifications and variations of the exemplary embodiments described herein, provided that they come within the scope of the appended claims and their equivalents.

What is claimed is:

1. An optical system comprising:
  a light source;
  a light-receiving surface facing the light source to receive light therefrom; and
  a first structured surface opposite a first portion of the light-receiving surface, the first structured surface including a plurality of first reflecting surfaces projecting at a plurality of first angles relative to the light-receiving surface and a plurality of first refractive surfaces projecting at a plurality of second angles relative to the light-receiving surface, each of the first refractive surfaces receiving light from a corresponding one of the first reflective surfaces for refractive transmission therethrough, wherein a first one of the first angles is different than a second one of the first angles, and a first one of the second angles is different than a second one of the second angles.

2. The optical system according to claim 1, wherein at least one of the first angles is greater than ninety degrees.

3. The optical system according to claim 1, wherein at least one of the first angles is approximately one hundred degrees.

4. The optical system according to claim 1, wherein the first structured surface is a total internal reflection Fresnel lens.

5. The optical system according to claim 1, further comprising a second structured surface opposite a second portion of the light-receiving surface, the second structured surface including a plurality of second refractive surfaces projecting at a plurality of third angles relative to the light-receiving surface, each of the second refractive surfaces receiving light directly from the light-receiving surface for refractive transmission therethrough, wherein the first and second portions of the light-receiving surface are positioned so that light from the light source incident on the light-receiving surface at an angle above a threshold angle falls on the first portion and light incident on the light-receiving surface at an angle below the threshold angle falls on the second portion.

6. The optical system according to claim 5, wherein a first one of the third angles is different than a second one of the third angles.

7. The optical system according to claim 5, wherein the first structured surface is a total internal reflection Fresnel lens and the second structured surface is a refractive Fresnel lens.

8. The optical system according to claim 5, wherein the first structured surface and the second structured surface have a substantially semicircular outer shape.

9. The optical system according to claim 5, wherein the first structured surface and the second structured surface have a substantially rectangular outer shape.

10. The optical system according to claim 5, wherein the threshold angle is selected so that a portion of light transmitted through the first structured surface is substantially equal to a portion of light transmitted through the second structured surface.

11. The optical system according to claim 5, wherein the threshold angle is from about forty-two to about forty-three degrees.

12. The optical system according to claim 5, wherein the light-receiving surface, the first structured surface and the second structured surface are comprised substantially of acrylic.

13. The optical system according to claim 1, wherein the light-receiving surface is substantially planar.

14. A rear projection display system, comprising:
   a light source;
   an optical lens, wherein the optical lens includes a light-receiving surface facing the light source to receive light therefrom, and a first structured surface opposite a first portion of the light-receiving surface, the first structured surface including a plurality of first reflecting surfaces projecting at a plurality of first angles relative to the light-receiving surface and a plurality of first refractive surfaces projecting at a plurality of second angles relative to the light-receiving surface, each of the first refractive surfaces receiving light from a corresponding one of the first reflective surfaces for refractive transmission therethrough;
   an enclosure situating the light source and optical lens; and
   a projection screen disposed to receive light from the optical lens and transmitting light received from the optical lens in a viewing direction, wherein the light source is situated at a light source angle greater than forty-two degrees.

15. The rear projection display system according to claim 14, further comprising:
   an aspheric mirror receiving light from the light source; and
   a back mirror receiving light from the aspheric mirror and reflecting a substantial portion of the light in a direction towards the light-receiving surface.

16. The rear projection display system according to claim 15, wherein the enclosure has a depth of less than twenty percent of a diagonal of the projection screen.

17. The rear projection display system according to claim 14, wherein a first one of the first angles is different than a second one of the first angles, and a first one of the second angles is different than a second one of the second angles.

18. The rear projection display system according to claim 14, wherein at least one of the first angles is greater than ninety degrees.

19. The rear projection display system according to claim 14, wherein at least one of the first angles is approximately one hundred degrees.

20. The rear projection display system according to claim 14, wherein the first structured surface is a total internal reflection Fresnel lens.

21. The rear projection display system according to claim 14, further comprising a second structured surface opposite a second portion of the light-receiving surface, the second structured surface including a plurality of second refractive surfaces projecting at a plurality of third angles relative to the light-receiving surface, each of the second refractive surfaces receiving light directly from the light-receiving surface for refractive transmission therethrough, wherein the first and second portions of the light-receiving surface are positioned so that light from the light source incident on the light-receiving surface at an angle above a threshold angle falls on the first portion and light incident on the light-receiving surface at an angle below the threshold angle falls on the second portion.

22. The rear projection display system according to claim 21, wherein a first one of the third angles is different than a second one or the third angles.

23. The rear projection display system according to claim 21, wherein the first structured surface is a total internal reflection Fresnel lens and the second structured surface is a refractive Fresnel lens.

24. The rear projection display system according to claim 21, wherein the first structured surface and the second structured surface have a substantially semicircular outer shape.

25. The rear projection display system according to claim 21, wherein the first structured surface and the second structured surface have a substantially rectangular outer shape.

26. The rear projection display system according to claim 21, wherein the threshold angle is from about forty-two to about forty-three degrees.

27. The rear projection display system according to claim 21, wherein the light-receiving surface, the first structured surface and the second structured surface are comprised substantially of acrylic.

28. The rear projection display system according to claim 14, wherein the light-receiving surface is substantially planar.

29. The rear projection display system according to claim 14, wherein the light source comprises a projection lens.

30. An optical lens comprising:

a light-receiving surface for receiving light; and a first structured surface opposite a first portion of the light-receiving surface, the first structured surface including a plurality of first reflecting surfaces projecting at a plurality of first angle relative to the light-receiving surface and a plurality of first refractive surfaces projecting at a plurality of second angles relative to the light-receiving surface, each of the first refractive surfaces configured to receive light from a corresponding one of the first reflective surfaces for refractive transmission therethrough, wherein a first one of the first angles is different than a second one of the first angles, and a first one of the second angles is different than a second one of the second angles.

31. The optical system according to claim 30, wherein the first structured surface is a total internal reflection Fresnel lens.

32. The optical system according to claim 30, further comprising a second structured surface opposite a second portion of the light-receiving surface, the second structured surface including a plurality of second refractive surfaces projecting at a plurality of third angles relative to the light-receiving surface, each of the second refractive surfaces configured to receive light directly from the light-receiving surface for refractive transmission therethrough; wherein the first and second portions of the light-receiving surface are configured so that light incident on the light-receiving surface at an angle above a threshold angle falls on the first portion and light incident on the light-receiving surface at an angle below the threshold angle falls on the second portion.

33. The optical system according to claim 32, wherein a first one of the third angles is different than a second one of the third angles.

34. The optical system according to claim 32, wherein the first structured surface is a total internal reflection Fresnel lens and the second structured surface is a refractive Fresnel lens.

* * * * *

UNITED STATES PATENT AND TRADEMARK OFFICE
CERTIFICATE OF CORRECTION

PATENT NO. : 7,350,925 B2 Page 1 of 1
APPLICATION NO. : 10/935638
DATED : April 1, 2008
INVENTOR(S) : Frederic R. Engstrom It is certified that error appears in the above-identified patent and that said Letters Patent is hereby corrected as shown below:

Column 11
Line 6, In Claim 30, delete "angle" and insert -- angles --, therefore.

Signed and Sealed this

Twenty-sixth Day of August, 2008

JON W. DUDAS
*Director of the United States Patent and Trademark Office*